(12) United States Patent
Cooley et al.

(10) Patent No.: US 7,970,836 B1
(45) Date of Patent: Jun. 28, 2011

(54) METHOD AND APPARATUS FOR PARENTAL CONTROL OF ELECTRONIC MESSAGING CONTACTS FOR A CHILD

(75) Inventors: Shaun Cooley, El Segundo, CA (US); Martin Fréchette, Arlington, MA (US)

(73) Assignee: Symantec Corporation, Mountain View, CA (US)

( * ) Notice: Subject to any disclaimer, the term of this patent is extended or adjusted under 35 U.S.C. 154(b) by 881 days.

(21) Appl. No.: 11/724,702

(22) Filed: Mar. 16, 2007

(51) Int. Cl.
*G06F 15/16* (2006.01)

(52) U.S. Cl. .......... 709/206; 709/223; 705/26.1; 705/39

(58) Field of Classification Search .................... 709/206
See application file for complete search history.

(56) References Cited

U.S. PATENT DOCUMENTS

| | | | |
|---|---|---|---|
| 7,032,023 B1* | 4/2006 | Barrett et al. | 709/225 |
| 2002/0049806 A1* | 4/2002 | Gatz et al. | 709/203 |
| 2004/0001606 A1* | 1/2004 | Levy | 382/100 |
| 2004/0022444 A1* | 2/2004 | Rhoads | 382/232 |
| 2004/0117664 A1* | 6/2004 | Colvin | 713/202 |
| 2004/0199582 A1* | 10/2004 | Kucharewski et al. | 709/204 |
| 2005/0027617 A1* | 2/2005 | Zucker et al. | 705/26 |
| 2005/0060167 A1* | 3/2005 | Patron et al. | 705/1 |
| 2006/0036701 A1* | 2/2006 | Bulfer et al. | 709/206 |
| 2006/0112433 A1* | 5/2006 | McIsaac et al. | 726/26 |
| 2006/0173793 A1* | 8/2006 | Glass | 705/75 |
| 2006/0271663 A1* | 11/2006 | Barillari et al. | 709/223 |
| 2006/0281447 A1* | 12/2006 | Lewis et al. | 455/418 |
| 2007/0214001 A1* | 9/2007 | Patron et al. | 705/1 |
| 2007/0271346 A1* | 11/2007 | Vill | 709/206 |

* cited by examiner

*Primary Examiner* — Krista M Zele
*Assistant Examiner* — Arvin Eskandarnia
(74) *Attorney, Agent, or Firm* — Hunton & Williams LLP

(57) ABSTRACT

Method and apparatus for parental control of electronic messaging contacts of a child is described. One aspect of the invention relates to communication of an electronic message from sender to recipient over a text-based communication channel established between sender and receiver clients on a network. A host on the network is configured to generate a unique identifier for the sender and maintain a log for the recipient. A first proxy module is configured to receive the electronic message from the sender client, embed the unique identifier associated with the sender therein, and forward the electronic message towards the receiver client over the text-based communication channel. A second proxy module is configured to receive the electronic message from the text-based communication channel, remove the unique identifier from the electronic message, send the unique identifier to the host for storage in the log, and forward the electronic message to receiver client.

16 Claims, 4 Drawing Sheets

FIG. 4    400

METHOD AND APPARATUS FOR PARENTAL CONTROL OF ELECTRONIC MESSAGING CONTACTS FOR A CHILD

BACKGROUND OF THE INVENTION

1. Field of the Invention

Embodiments of the invention generally relate to electronic messaging between devices. More specifically, this disclosure relates to a method and apparatus for parental control of electronic messaging contacts for a child.

2. Description of the Related Art

Electronic messaging has become an increasingly attractive mechanism for users of computing devices to communicate with one another. Examples of electronic messaging include e-mail, instant messaging, and the like. Recently, instant messaging has experienced phenomenal growth. Instant messaging allows a user of a computing device to send a message over a network to another user that is also online at the same time. With instant messaging, a user inputs the names or identifications of other users with which he/she wishes to communication into a list. When any of those individuals logs-on to the network, the user is "instantly" notified of the presence of the other user on the network so that an interactive chat session may begin. During the interactive chat session, the instant messages are immediately routed to the user's computing devices and displayed on a pop-up window. In this way, two or more users may converse with one another in a simulated real-time manner through text messages. Examples of instant messaging systems include AOL's Instant Messenger (AIM), Microsoft Network Messenger Service (MSNMS), ICQ, and Yahoo! Messenger.

With the proliferation of instant messaging systems, computer-to-computer "chatting" has become the primary computer pursuit for many users. Nowhere is this pastime more pervasive than in the early to mid-adolescent user community. Unfortunately, with the ubiquity of this community's use comes problems. Instant messaging systems typically do not verify the identities of the users. As such, instant messaging systems have been used by persons of ill-repute to prey on other users, notably, minor child users. Presently, the only mechanism parents have for identifying the true identities of their child's instant messaging contacts (also referred to as "buddies") is to ask their child. Children, however, can be misled as to the true identity of a buddy or may lie about such identity. Therefore, there exists a need in the art for parental control of electronic messaging contacts of a child.

SUMMARY OF THE INVENTION

Method and apparatus for parental control of electronic messaging contacts of a child is described. One aspect of the invention relates to a method of receiving an electronic message from a sender. The electronic message is received over a text-based communication channel in a network. The electronic message includes a unique identifier for the source embedded therein. The unique identifier is removed from the electronic message. The electronic message is passed to a client for presentation of the electronic message to a recipient. The unique identifier is sent to a host on the network for storage in a log for the recipient.

Another aspect of the invention relates to a method of sending an electronic message from a sender. Registration information for the sender is sent to a host on a network. The registration information does not compromise the identity of the sender. A unique identifier is received from the host in response to the registration information. An electronic message generated by the sender using a client is received. The unique identifier is embedded in the electronic message. The electronic message is sent towards a recipient over a text-based communication channel in the network.

Another aspect of the invention relates to an apparatus for communication of an electronic message from a sender to a recipient over a text-based communication channel established between sender and receiver clients on a network. A host on the network is configured to generate a unique identifier for the sender and maintain a log for the recipient. A first proxy module is configured to receive the electronic message from the sender client, embed the unique identifier associated with the sender therein, and forward the electronic message towards the receiver client over the text-based communication channel. A second proxy module is configured to receive the electronic message from the text-based communication channel, remove the unique identifier from the electronic message, send the unique identifier to the host for storage in the log, and forward the electronic message to receiver client.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
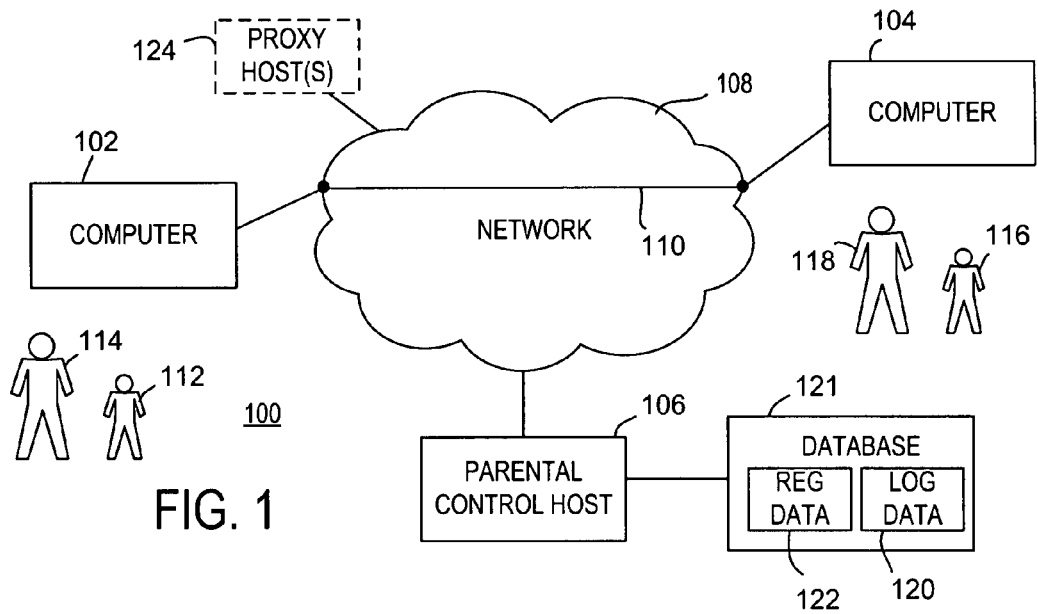
FIG. 1 is a block diagram depicting an exemplary embodiment of a networked computer system in accordance with one or more aspects of the invention.

FIG. 1 is a block diagram depicting an exemplary embodiment of a networked computer system 100 in accordance with one or more aspects of the invention. The system 100 includes a computer 102, a computer 104, and a parental control host 106, each coupled to a network 108. The network 108 comprises a communication system that connects computer systems by wire, cable, fiber optic, and/or wireless links facilitated by various types of well-known network elements, such as hubs, switches, routers, and the like. The network 108 may employ various well-known protocols to communicate information. For example, the network 108 may be part of the Internet. The computers 102 and 104 may be any type of device capable of sending electronic messages over the network 108, such as personal computers (PCs), personal digital assistants (PDAs), wireless telephones, and the like. The parental control host 106 may comprise a computer capable of implementing a parental control service for a plurality of clients as described below.

The computers 102 and 104 are configured to exchange electronic messages over a text-based communication channel 110 in the network. Such electronic messages may include, for example, electronic mail (e-mail), instant messages (IMs), short message service (SMS) messages, or the like. For purposes of clarity by example, the electronic messaging implemented in the system 100 is described in terms of instant messaging. Those skilled in the art will appreciate that the aspects of the invention described below with respect to the specific embodiment of instant messaging may also be applied to other types of electronic messaging, including those listed above.

In the present example, the computer 102 includes a user 112 and a user 114. The user 112 is illustratively a minor child and the user 114 is illustratively a parent or guardian of the minor child 112. Likewise, the computer 104 includes a user 116 and a user 118. The user 116 is illustratively a child and the user 118 is illustratively a parent or guardian of the child 116. Although a parent/child relationship among the users is described as an example, in general it is assumed that the users 114 and 116 are custodians that exhibit some form of custodial control over the users 112 and 116, respectively. For example, it is not necessary that the users 112 and 116 be minors, be actual children of the users 114 and 118, or even be related to the users 114 and 118. Likewise, it is not necessary that the users 114 and 118 be parents of the users 112 and 116 or even be related to the users 112 and 116.

Figure 2:
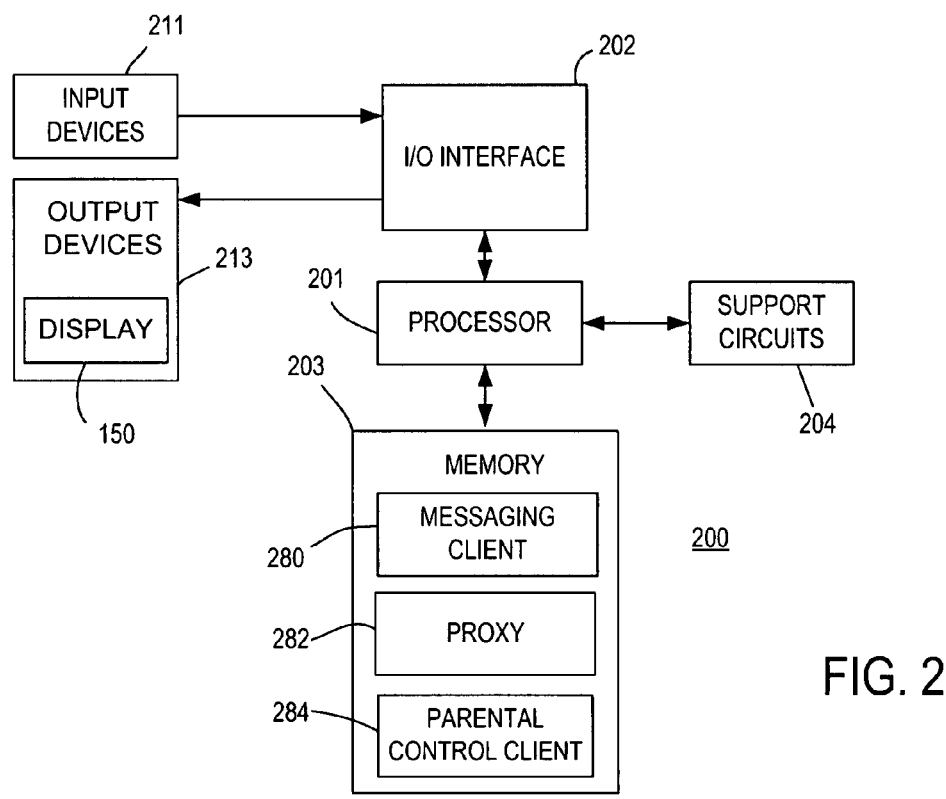
FIG. 2 is a block diagram depicting an exemplary embodiment of a computer in accordance with one or more aspects of the invention.

FIG. 2 is a block diagram depicting an exemplary embodiment of a computer 200 in accordance with one or more aspects of the invention. The computer 200 may be used to implement any of the computers 102 and/or 104 of FIG. 1. The computer 200 illustratively includes a processor 201, a memory 203, various support circuits 204, and an I/O interface 206. The processor 201 may include one or more microprocessors known in the art. The support circuits 204 for the processor 201 include conventional cache, power supplies, clock circuits, data registers, I/O interfaces, and the like. The I/O interface 202 may be directly coupled to the memory 203 or coupled through the processor 201. The I/O interface 202 may also be configured for communication with input devices 211 and/or output devices 213, such as, network devices, various storage devices, mouse, keyboard, and the like. Notably, the output devices 213 may include a display 250. The I/O interface 206 is also coupled to the network 108.

The memory 203 stores processor-executable instructions and/or data that may be executed by and/or used by the processor 201. These processor-executable instructions may comprise hardware, firmware, software, and the like, or some combination thereof. Modules having processor-executable instructions that are stored in the memory 203 may include a messaging client 280, a proxy module 282, and a parental control client 284. Operations of the modules 280-284 are discussed below. The computer 104 may be programmed with an operating system, which may include OS/2, Java Virtual Machine, Linux, Solaris, Unix, HPUX, AIX, Windows, among other known platforms. At least a portion of the operating system may be disposed in the memory 203. The memory 203 may include one or more of the following random access memory, read only memory, magneto-resistive read/write memory, optical read/write memory, cache memory, magnetic read/write memory, and the like, as well as signal-bearing media as described below.

With reference to FIGS. 1 and 2, the messaging client 280 is configured to establish text-based communication channels through the network 108 for the exchange of instant messages. Each of the computers 102 and 104 is configured with the messaging client 280 to establish the channel 110. The messaging client 280 may be any known IM client, such as those described above. The messaging client 280 is configured to maintain a list of contacts for one or more users. A "contact" is a name or handle of another user of the instant messaging system. The messaging client 280, however, does not directly receive incoming instant messages from the network 108 or directly couple outgoing instant messages to the network 108. Rather, outgoing and incoming instant messages are processed, as described further below.

The parental control client 284 is configured to cooperate with the parental control host 106 for monitoring instant message contacts. To initiate monitoring, a parent registers his or her child with the parental control host 106 in order to obtain a unique identifier associated with the child. The registration is done in a manner that does not compromise the identity of the child. In one embodiment, registration proceeds by submitting information that can be used to contact the parent. Information particular to the child, such as the child's name, is not provided. The contact information for the parent may be an electronic address, such as an e-mail address or instant messaging contact. An electronic address for the parent contact information may be used to avoid disclosing the actual home mailing address of the parent, which is likely the home mailing address for the child. Other types of information may also be submitted during registration, such as a list of contacts of the child, a general location of the parent/child (e.g., city, state, region, etc.).

The unique identifier for the child may comprise any type identification indicia, such as a globally unique identifier (GUID) or other type of alpha-numeric identifier. The proxy module 282 is configured to proxy instant message communications for the messaging client 280. Mechanisms for creating a proxy are well known in the art, such as transmission control protocol (TCP) data proxying. In general, the proxy module 282 is capable of capturing, modifying, deleting, and injecting instant messages into the channel. Notably, the proxy module 282 captures outgoing instant messages before they are coupled to the network 108, and captures incoming instant messages before they are coupled to the messaging client 280.

For each captured outbound message, the proxy module 282 identifies the user that generated the message. Based on the identity of the user, the proxy module 282 embeds the corresponding unique identifier into the outbound message (if such unique identifier exists for the identified user). For example, assume that the child 112 generates an IM to send to the child 116. The proxy module 282 in the computer 102 captures the outbound IM and identifies the child 112 as the sender. The proxy module 282 then embeds the unique identifier for the child 112 into the outbound IM (assuming the parent 114 has registered with the parental control host 106) and sends the IM towards the computer 104 of the child 116.

The unique identifier for a child may be embedded in outbound IMs in various ways, depending on the allowed communication over the text-based channel 110. For example, if the channel 110 allows full hypertext markup language (HTML) messages, the unique identifier may be placed as an attribute on a tag that exists in the HTML of the IM. The tag used may be any tag existing in the HTML or a new, custom tag may be added to the HTML of the message to hold the unique identifier. A tag in the HTML of a message is generally not visible to the recipient. Thus, the unique identifier will not appear in the visual presentation of the message to a recipient that does not subscribe to the parental control service provided by the parental control host 106.

Some channels allow for partial HTML in the messages, such as tags for text color, font size, and the like. For partial HTML channels, the unique identifier may be appended to the message as text, but the color of the appended text is changed to match the background color of the particular message client used by the recipient (the proxy module 282 may obtain the background color from the channel, i.e., from either the client in the sending machine of the client in the recipient machine). Again, the unique identifier will generally not appear in the visual presentation of the message to a recipient that does not subscribe to the parental control service. Such a recipient may still see the unique identifier if they selected the text (thus making it visible), but security is still maintained, since the unique identifier contains nothing that compromises the identity of the child.

Other channels only allow for plain text messages. For plain text channels, the unique identifier may be encoded into the text message using text-in-text steganography techniques (e.g., white space coding and the like). Alternatively, the unique identifier can appended as plain text to the message. Again, since the unique identifier does not include information that compromises the identity of the child, security is still maintained.

For each captured inbound message, the proxy module 282 attempts to identify an embedded unique identifier. If a unique identifier is found, the proxy module 282 removes the unique identifier from the instant message and then forwards the instant message to the messaging client 280. Continuing the example above, assume that the proxy module 282 captures an inbound message for the child 116 that was sent by the child 112. As described above, the received message includes the unique identifier for the child 112. The proxy module 282 captures the inbound message and removes the unique identifier for the child 112 from the message. The inbound message is then passed to the messaging client 280 for presentation to the child 116. After removing the unique identifier from the inbound message, the proxy module 282 may send the unique identifier to the parental control host 106 for storage in a log for the child 116. The proxy module 282 may maintain a cache of unique identifiers such that each new unique identifier is only sent to the parental control host 106 once.

In this manner, the parental control host 106 maintains log data 120 that includes a log for each registered child. Each log includes unique identifiers of those contacts that sent IMs to the respective child. The parental control host 106 also maintains registration data 122 for each registered child. The parental control client 284 may be used to query the parental control host 106 to monitor a child's IM contacts. For example, a parent may log into the parental control host 106, which then presents a list of new contacts with which the child has communicated. For a given contact, the parent may query the parental control host 106 to obtain information that was registered for the contact, such as information for communicating with the parent of the contact. The parental control host 106 obtains this information from the registration data 122 using the unique identifier for the given contact as a search token. The log data 120 and the registration data 122 may be stored in a database 121 coupled to the parental control host 106.

Continuing with the above example, the parent 118 may log into the parental control host 106 and see that the child 116 has communicated with a new contact (i.e., the handle for the child 112). The parent 118 may then query the parental control host 106 to obtain registration information for the child 112, which may include contact information for the parent 114. The parental control host 106 uses the unique identifier recorded for the new contact (i.e., the unique identifier of the child 112) as a search token to retrieve the appropriate registration information from the registration data 122. The parent 118 may then send a message or otherwise communicate with the parent 114 in order to verify that the children 112 and 116 should be allowed to communicate via instant messaging. Notably, the identity of the child 112 is always protected and is never known by the parent 118 (unless or until divulged by the parent 114 upon contact).

In the embodiments described above, the proxy module 282 is disposed in the computers 102 and 104. In other embodiments, the proxy module 282 may be moved into the network 108. For example, the proxy module 282 may be implemented using one or more proxy hosts 124 coupled to the network 108. For example, the messaging client 280 may be configured with an address of a proxy host 124 (e.g., an internet protocol (IP) address). The proxy host 124 would then capture and analyze inbound and outbound messages with respect to the messaging client 280 in a manner similar to that described above.

Figure 3:
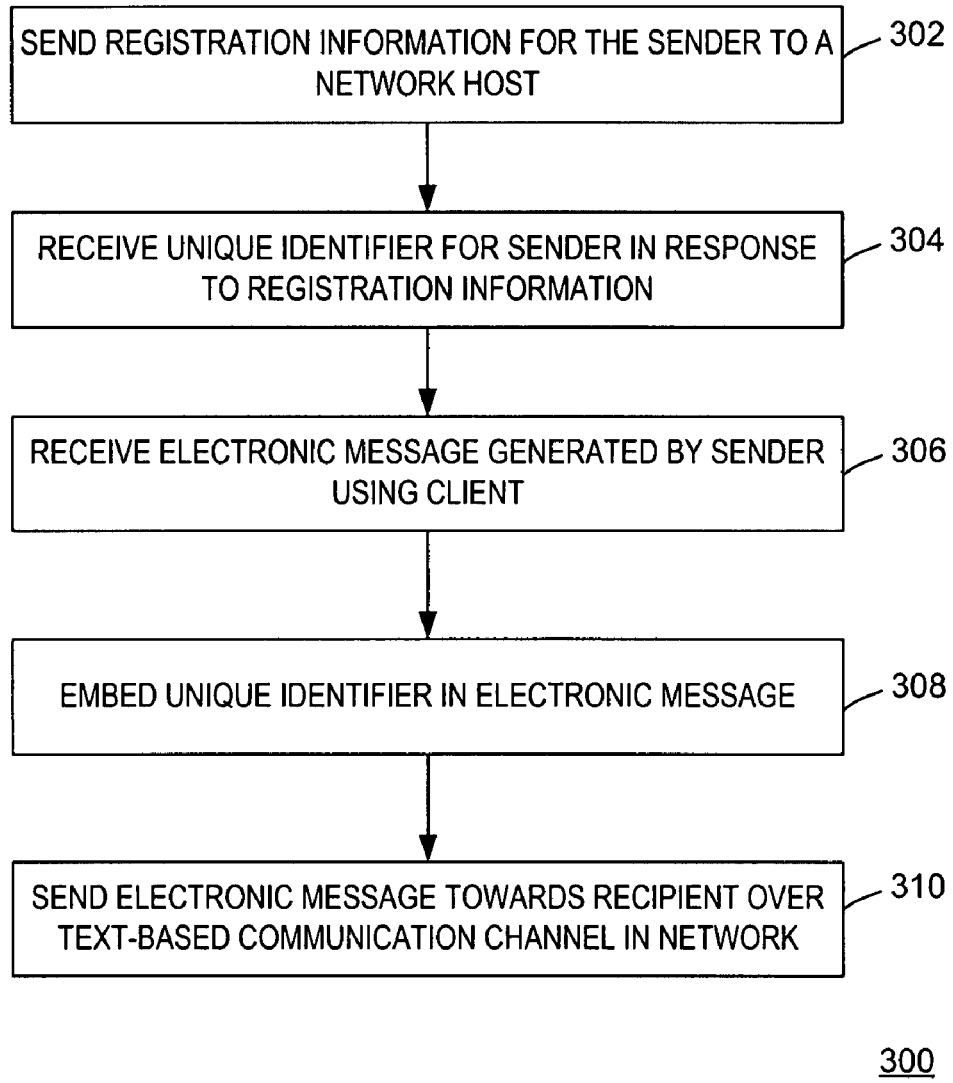
FIG. 3 is a flow diagram depicting an exemplary embodiment of a method for sending an electronic message from a sender in accordance with one or more aspects of the invention.

FIG. 3 is a flow diagram depicting an exemplary embodiment of a method 300 for sending an electronic message from a sender in accordance with one or more aspects of the invention. The method 300 begins at step 302, where information designated for the sender is registered with a host on a network. The registration information does not compromise the identity of the sender. The types of such registration information have been described above, and may include contact information for a custodian of the sender. In one embodiment, the sender is a minor child and the custodian is a parent or guardian of the minor child. At step 304, a unique identifier is received from the host, in response to the registration. The unique identifier is associated with the sender.

At step 306, an electronic message generated by the sender using a client is received. For example, an IM generated by the sender using an IM client is received (e.g., captured). At step 308, the unique identifier is embedded in the electronic message. Embodiments of embedding are described above. At step 310, the electronic message is sent towards a recipient over a text-based communication channel in the network. Steps 306 through 310 may be repeated for each electronic message generated by the sender. Steps 302 and 304 need only be performed once for a given sender.

Figure 4:
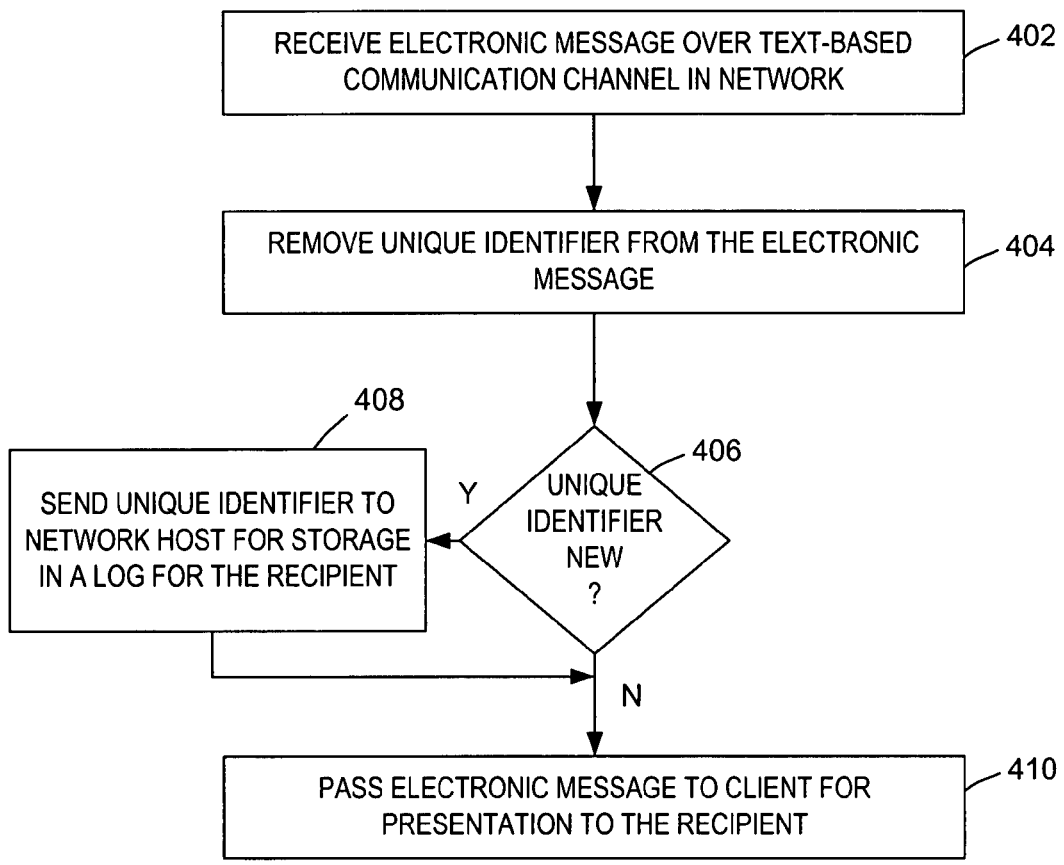
FIG. 4 is a flow diagram depicting an exemplary embodiment of a method for receiving an electronic message from a sender in accordance with one or more aspects of the invention.

FIG. 4 is a flow diagram depicting an exemplary embodiment of a method 400 for receiving an electronic message from a sender in accordance with one or more aspects of the invention. At step 402, the electronic message is received over a text-based communication channel in a network. The electronic message includes a unique identifier for the sender embedded therein. For example, an IM having a unique identifier for the sender may be received (e.g., captured). At step 404, the unique identifier is removed from the electronic message. At step 406, a determination is made whether the unique identifier is new. If so, the method 400 proceeds to step 408, where the unique identifier is sent to a host on the network for storage in a log for the recipient. The method 400 then proceeds to step 410. If at step 406 the unique identifier is not new (e.g., has been previously detected and logged), the method 400 proceeds to step 410. At step 410, the electronic message is passed to a client for presentation to a recipient. The method 400 may be repeated for each received electronic message for a given recipient.

Figure 5:
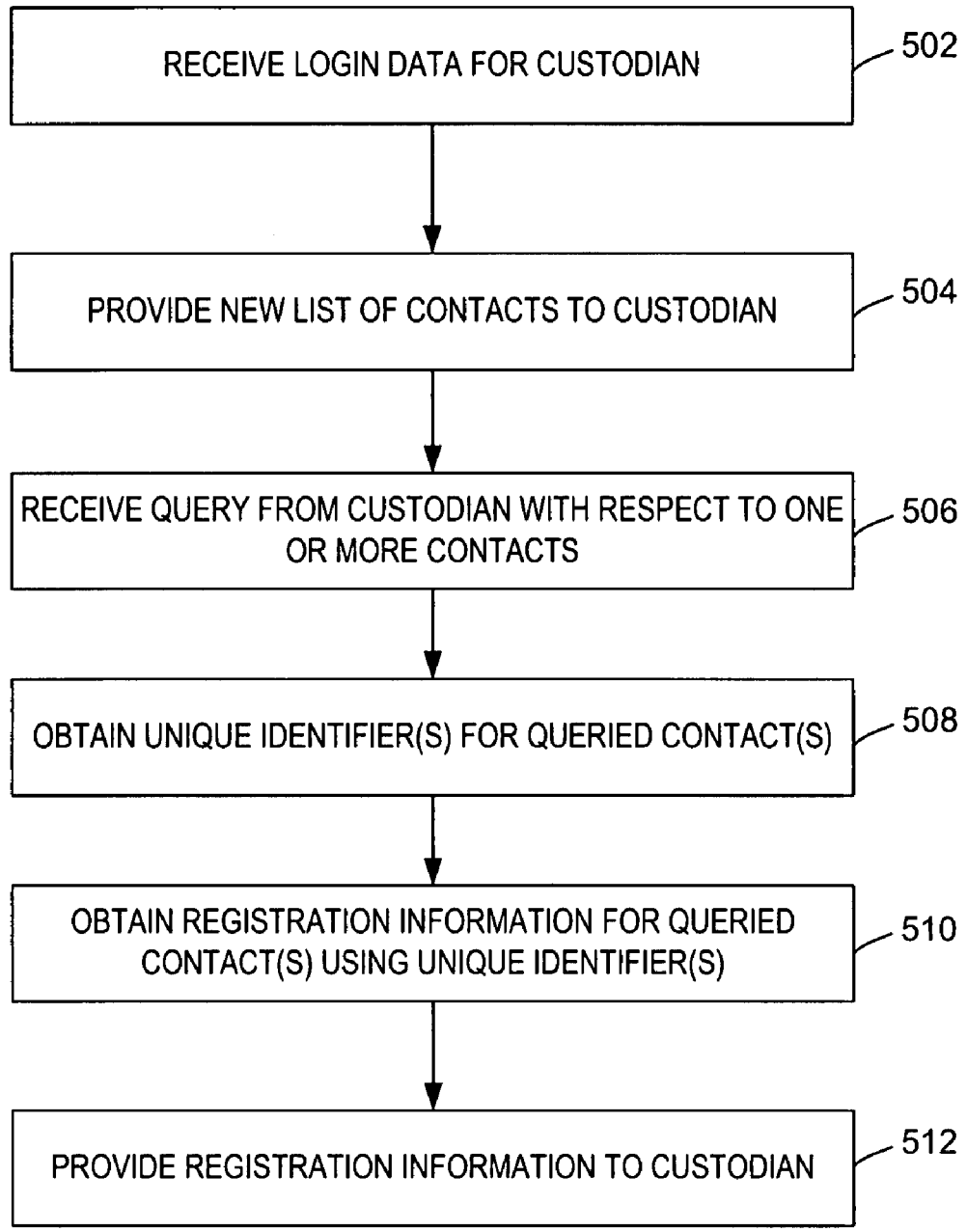
FIG. 5 is a flow diagram depicting an exemplary embodiment of a method for monitoring electronic messaging contacts of a user in accordance with one or more aspects of the invention.

FIG. 5 is a flow diagram depicting an exemplary embodiment of a method 500 for monitoring electronic messaging contacts of a user in accordance with one or more aspects of the invention. The method 500 may be performed by the parental control host 106 of FIG. 1. The method 500 begins at step 502, where login data for a custodian is received. At step 504, a list of new contacts is provided to the custodian. The list of new contacts includes new contacts with which a recipient under control of the custodian has communicated. For example, the recipient may be minor child and the custodian may be a parent or guardian of the minor child. At step 506, a query is received from the custodian with respect to one or more of the new contacts. At step 508, the unique identifier is obtained from a log for each of the queried contacts. At step 510, registration information is obtained for each of the queried contacts using the unique identifier thereof. At step 512, the registration information is provided to the custodian. As described above, the registration information does not compromise the identity of the contact. The registration information may include, for example, contact information for a parent, guardian, or other custodian of the contact.

While the foregoing is directed to embodiments of the present invention, other and further embodiments of the invention may be devised without departing from the basic scope thereof, and the scope thereof is determined by the claims that follow.

What is claimed is:

1. A method of receiving an electronic message from a sender, comprising:
   receiving the electronic message over a text-based communication channel in a network, the electronic message having a unique identifier for the source embedded therein;
   removing the unique identifier from the electronic message;
   passing the electronic message to a client for presentation of the electronic message to an intended recipient;
   sending the unique identifier, removed from the electronic message, to a host on the network for storage in a log for the intended recipient of the electronic message; and
   obtaining registration information associated with the sender from the host in response to a request for the registration information from a first custodian associated with the intended recipient, the registration information being selected by the host based on the unique identifier in the log, wherein the registration information includes information for contacting a second custodian associated with the sender such that the first custodian is enabled to communicate with the second custodian without compromising the identity of the sender or the intended recipient, wherein the first custodian has custodial control over the intended recipient, and wherein the second custodian has custodial control over the sender.

2. The method of claim 1, wherein the intended recipient is a minor child and wherein the first custodian is a parent or guardian of the minor child.

3. The method of claim 1, wherein the text-based communication channel comprises an instant messaging (IM) channel, and wherein the electronic message comprises an instant message.

4. The method of claim 1, wherein the electronic message comprises a hypertext markup language (HTML) message, and wherein the unique identifier comprises an attribute of a tag in the HTML message.

5. The method of claim 1, wherein the unique identifier is appended to the electronic message as text, the text having a color that matches a background color of the client.

6. The method of claim 1, wherein the unique identifier is encoded in the electronic message using text-in-text steganography coding.

7. A method of sending an electronic message from a sender, comprising:
   sending registration information for the sender to a host on a network, the registration information not compromising the identity of the sender;
   receiving a unique identifier from the host in response to the registration information;
   receiving an electronic message generated by the sender using a client;
   embedding the unique identifier in the electronic message; and
   sending the electronic message to an intended recipient over a text-based communication channel in the network, wherein a first custodian associated with the intended recipient obtains the registration information associated with the sender from the host in response to a request for the registration information, the registration information is selected by the host based on the unique identifier, and wherein the registration information includes information for contacting a second custodian associated with the sender such that the first custodian is enabled to communicate with the second custodian without compromising the identity of the sender or the intended recipient, wherein the first custodian has custodial control over the intended recipient, and wherein the second custodian has custodial control over the sender.

8. The method of claim 7, wherein the sender is a minor child and wherein the second custodian is a parent or guardian of the minor child.

9. The method of claim 7, wherein the text-based communication channel comprises an instant messaging (IM) channel, and wherein the electronic message comprises an instant message.

10. The method of claim 7, wherein the electronic message comprises a hypertext markup language (HTML) message, and wherein the step of embedding comprises inserting the unique identifier as an attribute of a tag in the HTML message.

11. The method of claim 7, wherein the step of embedding comprises:
    identifying a background color of a client at the destination; and
    appending the unique identifier to the electronic message as text, the text having a color that matches the background color.

12. The method of claim 7, wherein the step of embedding comprises encoding the unique identifier in the electronic message using text-in-text steganography coding.

13. A system for communication of an electronic message from a sender to an intended recipient over a text-based communication channel established between sender and receiver clients on a network, comprising:
    at least one processor configured to:
       generate a unique identifier for the sender and maintain a log for the intended recipient;
       receive the electronic message from the sender client, embed the unique identifier associated with the sender therein, and forward the electronic message towards the receiver client over the text-based communication channel; and
       receive the electronic message from the text-based communication channel, remove the unique identifier from the electronic message, send the unique identifier, removed from the electronic message, to the host for storage in the log, obtain registration information associated with the sender from the host in response to a request for the registration information from a first custodian associated with the intended recipient, the registration information being selected by the host based on the unique identifier in the log, and forward the electronic message to receiver client, wherein the registration information includes information for contacting a second custodian associated with the sender such that the first custodian is enabled to communicate with the second custodian without compromising the identity of the sender or the intended recipient, wherein the first custodian has custodial control over the intended recipient, and wherein the second custodian has custodial control over the sender; and at least one memory, coupled to the at least one processor, configured to provide the at least one processor with instructions.

14. The system of claim 13, further comprising:
a first control client configured to send registration information to the sender with the host and receive the unique identifier from the host in response to the registration information, the registration information not compromising the identity of the sender.

15. The system of claim 14, further comprising:
a second control client configured to send a query to the host;
wherein the host is further configured to obtain the registration information based on the unique identifier in the log and forward the registration information to the second control module in response to the query.

16. The system of claim 13, wherein the sender and receiver clients are instant messaging (IM) clients, wherein the text-based communication channel is an IM channel, and wherein the electronic message is an instant message.

* * * * *